United States Patent [19]

Kuwana et al.

[11] Patent Number: 5,015,041
[45] Date of Patent: May 14, 1991

[54] ANTI-SKID CONTROL SYSTEM FOR AN AUTOMOTIVE VEHICLE

[75] Inventors: Kazutaka Kuwana, Toyota; Tsuyoshi Yoshida, Oobu; Kenji Tozu, Kariya; Shinsuke Sakane, Toyota, all of Japan

[73] Assignee: Aisin Seiki K.K., Aichi, Japan

[21] Appl. No.: 454,253

[22] Filed: Dec. 21, 1989

[30] Foreign Application Priority Data

Dec. 24, 1988 [JP] Japan .................................. 63-327424

[51] Int. Cl.⁵ .............................................. B60T 8/58
[52] U.S. Cl. .................................. 303/95; 188/181 C; 303/96; 303/97; 303/100; 303/103; 303/111; 364/426.02
[58] Field of Search ........................ 303/91, 95–96, 303/98, 97, 100, 102, 103, 105, 106, 107, 108, 109, 111, 104; 364/426.02; 188/181 C

[56] References Cited

U.S. PATENT DOCUMENTS 4,005,910 2/1977 Leiber .
4,059,312 11/1977 Jonner .............................. 303/96 X
4,933,854 6/1990 Miyaka ............................. 303/111 X

*Primary Examiner*—Douglas C. Butler
*Attorney, Agent, or Firm*—Sughrue, Mion, Zinn, Macpeak & Seas

[57] ABSTRACT

An anti-skid control system for an automotive vehicle is provided with braking condition detectors for detecting at least a running condition of the vehicle in braking operation and producing a detected signal corresponding to the running condition. The detected signal is compared with a reference value to produce a braking condition signal. In response to the braking condition signal, selectively provided is one control mode of a simultaneous control mode for controlling simultaneously a braking force applied to both of a pair of right and left road wheels and an independent control mode for controlling independently a braking force applied to each of the right and left road wheels. Then, the braking force applied to the right and left road wheels is controlled in accordance with the control mode.

7 Claims, 6 Drawing Sheets

ANTI-SKID CONTROL SYSTEM FOR AN AUTOMOTIVE VEHICLE

BACKGROUND OF THE INVENTION

1. Field of the Invention

The present invention relates to an anti-skid control system for use in an automotive vehicle, and more particularly to an anti-skid control system for controlling a braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In order to prevent the road wheels from being locked, therefore, there has been employed an anti-skid control system which controls the braking force by decreasing, increasing, or holding a hydraulic braking pressure supplied to wheel brake cylinders, and which is also called as an anti-locking control system. The anti-skid control system includes the system for the rear road wheels and that for front and rear road wheels, i.e., four wheel control system. In the case where the road wheels are prevented from being locked according to the former system, the running stability may be ensured and the stopping distance may be minimized. In the case where the front road wheels are also prevented from being locked according to the latter system, the controllability may be maintained.

In view of the fact that, when a hydraulic braking pressure supplied to each wheel brake cylinder is increased, the rotational speed of the road wheel is rapidly reduced immediately before the coefficient of friction relative to the road wheel reaches a maximum, the anti-skid control system controls the wheel cylinder pressure according to the deceleration of the vehicle in order that a slip rate of the road wheel results in around 20%, that is, the maximum coefficient of friction is obtained.

As for the control of the braking force applied to each road wheel according to the above anti-skid control system, so called low-select simultaneous control mode is employed particularly for the right and left rear road wheels. According to the low-select simultaneous control mode, a braking force, which is applied to one of the rear road wheels rotating at the lower speed and having a tendency to be locked first, is applied to both of the right and left rear road wheels simultaneously. Consequently, the running stability of the vehicle may be ensured, even in the case where one of the two rear road wheels is positioned on a road of a high coefficient of friction and the other is positioned on a road of a low coefficient of friction, for example. Thus, the braking force applied to the front road wheels is controlled according to an independent control mode for controlling independently the braking force applied to each front road wheel, while the braking force applied to the rear road wheels is controlled according to the simultaneous control mode for controlling simultaneously the braking force applied to both rear road wheels on the basis of the braking force applied to the road wheel rotating at the lower speed.

In Japanese Patent Publication No. Sho 56-28741, there is disclosed a device for changing control modes in the case where two groups of road wheels are controlled by one same actuator. Namely, a low-speed selection mode for controlling the actuator on the basis of the condition of the road wheel having a tendency to be locked first, and a high-speed selection mode for controlling the actuator on the basis of the condition of the road wheel having a tendency to be locked later, are changed over to each other depending upon the braking condition.

According to the simultaneous control mode for controlling simultaneously the braking force applied to both two rear road wheels, when the vehicle is undergoing a cornering maneuver on the road of the high coefficient of friction, for example, a difference in wheel speed between the road wheel located on the inside of the curve in the vehicle's path (hereinafter referred to as inner road wheel) and the road wheel located on the outside of the curve in the vehicle's path (hereinafter referred to as outer road wheel) is produced in turning of the vehicle as is well known, so that the braking force applied to the inner road wheel at the lower speed is possibly selected according to the low-select mode, notwithstanding that the vehicle is running on the road of the high coefficient of friction. Then, the braking force applied to the outer road wheel might be insufficient, so that the stopping distance might be caused to extend. Further, when the vehicle is running on the road of the low coefficient of friction at low speed, if the braking force applied to the two rear road wheels is controlled simultaneously, a considerable load is applied to the rear road wheels in braking operation, so that a vertical vibration of the vehicle is likely to be caused.

SUMMARY OF THE INVENTION

Accordingly, it is an object of the present invention to provide an anti-skid control system for an automotive vehicle which ensures a running stability of the vehicle and attains reduction of a stopping distance by properly changing one control mode to the other between a simultaneous control mode and an independent control mode for a pair of road wheels depending upon the road conditions in braking operation.

In accomplishing the above and other objects, an anti-skid control system for controlling a braking force applied to road wheels of a vehicle comprises braking condition detecting means for detecting at least a running condition of the vehicle in braking operation and producing a detected signal corresponding to the running condition, reference value setting means for setting a reference value representing a predetermined running condition of the vehicle, and braking condition determining means for comparing the detected signal with the reference value and producing a braking condition signal in response to a result of comparison. The anti-skid control system further comprises control mode changing means for selectively providing one control mode of a simultaneous control mode for controlling simultaneously a braking force applied to both of a pair of right and left road wheels and an independent control mode for controlling independently a braking force applied to each of the right and left road wheels in response to the braking condition signal, and braking force control means for controlling the braking force applied to the road wheels in accordance with the control mode provided by the control mode changing means.

In the above-described anti-skid control system, the control mode changing means selectively provides the control mode for a pair of right and left road wheels at a rear side of the vehicle, preferably.

Preferably, the braking condition detecting means comprises vehicle speed detecting means for detecting at least a vehicle speed of the vehicle in braking operation and producing a detected signal corresponding to the vehicle speed. The reference value setting means sets a predetermined vehicle speed as the reference value, and the braking condition determining means compares the detected vehicle speed signal in magnitude with the predetermined vehicle speed.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
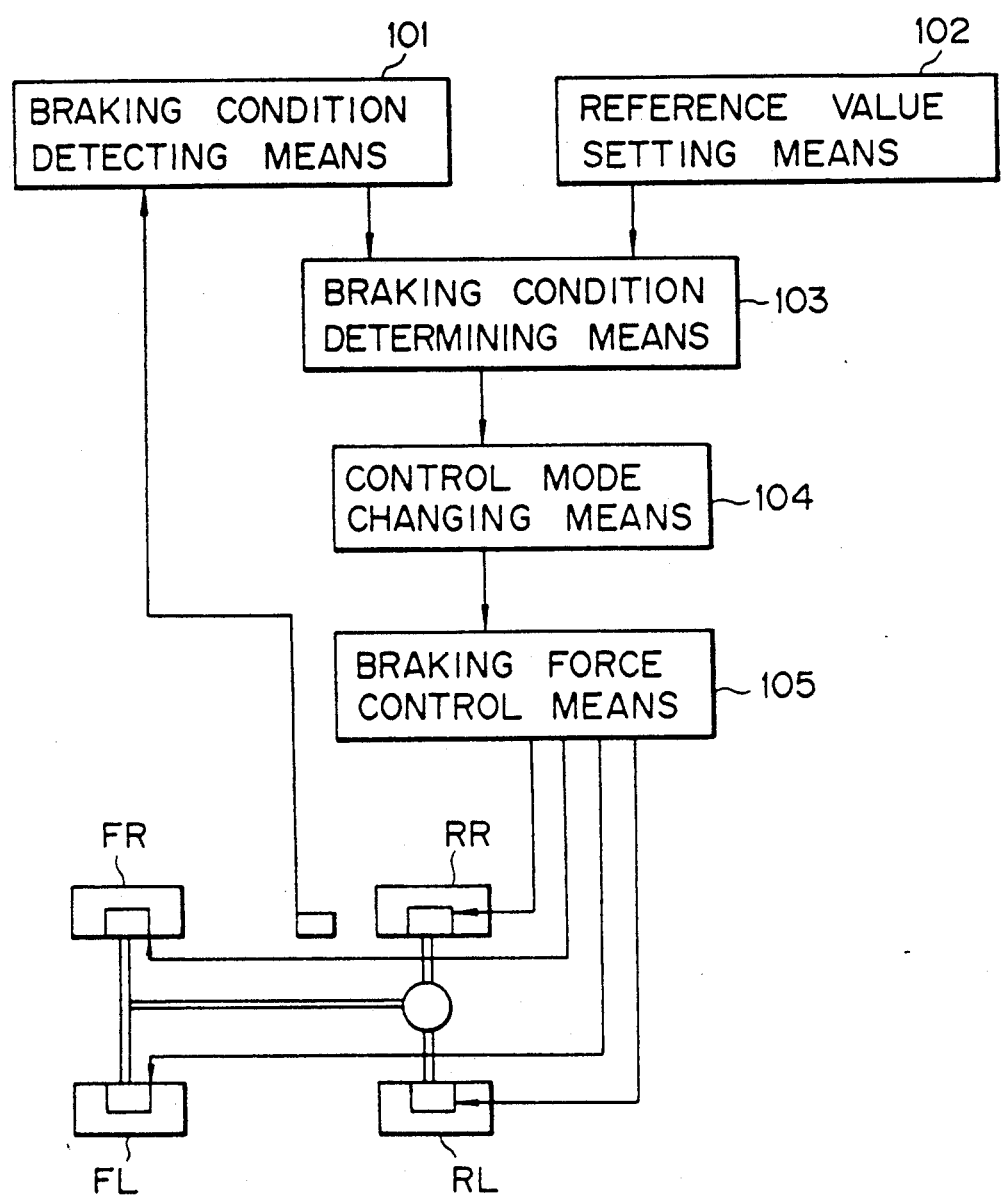
FIG. 1 is a general block diagram illustrating an anti-skid control system according to the present invention.

Referring to FIG. 1, there is illustrated an anti-skid control system according to the present invention, which controls a braking force applied to each of front road wheels FR, FL and rear road wheels RR, RL of a vehicle depending upon a braking condition.

In the anti-skid control system, braking condition detecting means 101 detects at least a running condition of the vehicle in braking operation and provides a signal corresponding to the detected running condition. Reference value setting means 102 sets a reference value representing a predetermined running condition of the vehicle. Then, braking condition determining means 103 compares the detected signal with the reference value and provides a braking condition signal in response to a result of comparison. Control mode changing means 104 selectively provides one control mode of a simultaneous control mode for controlling simultaneously a braking force applied to both of a pair of right and left rear road wheels RR, RL and an independent control mode for controlling independently a braking force applied to each of the right and left rear road wheels RR, RL in response to the braking condition signal. Braking force control means 105, which is arranged to control the braking force applied to each of the road wheels FR, FL, RR and RL of the vehicle to prevent them from being locked, controls the braking force applied to the right and left rear road wheels RR, RL in accordance with the control mode provided by the control mode changing means 104.

Figure 2:
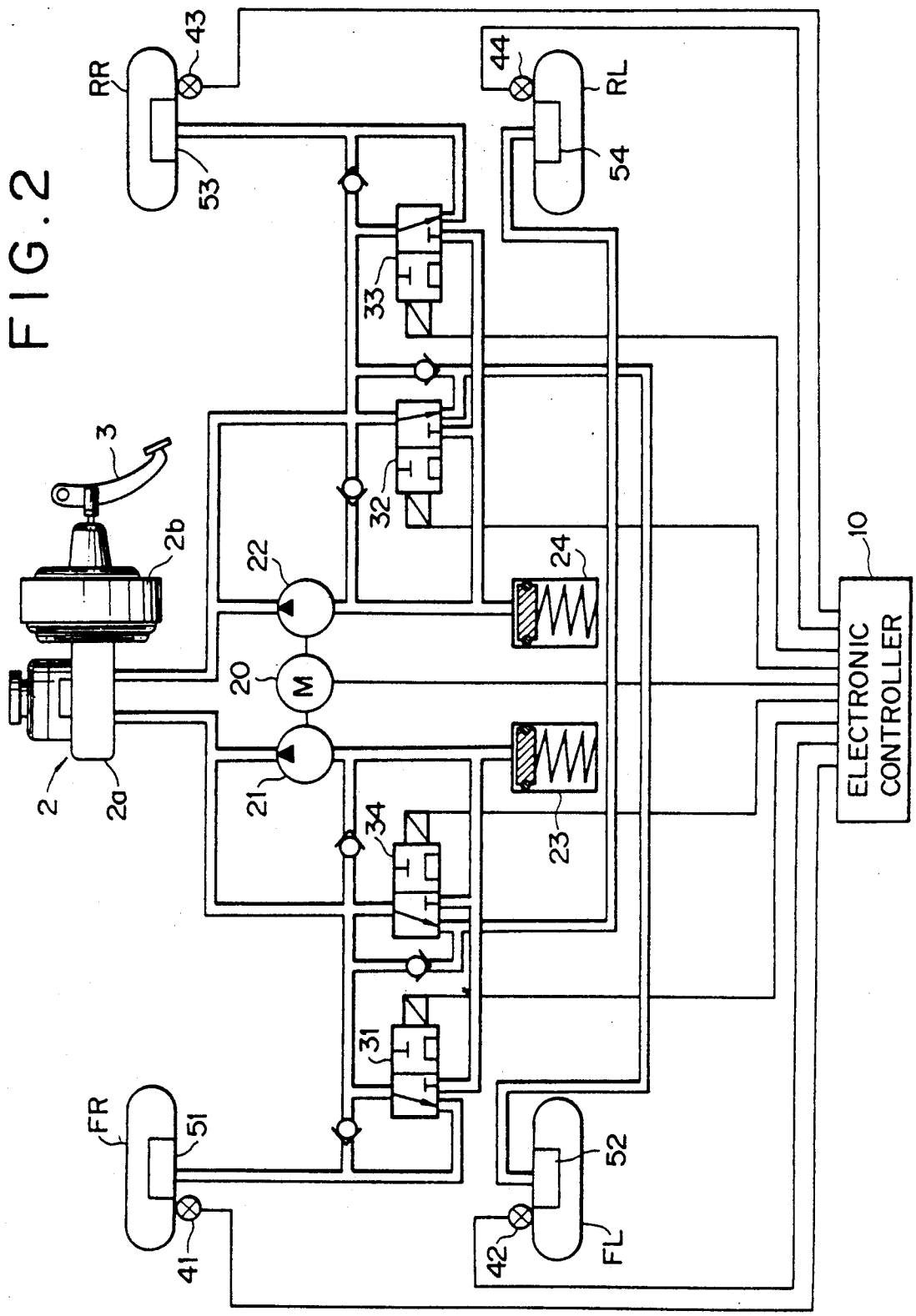
FIG. 2 is a schematic block diagram of an anti-skid control system of an embodiment of the present invention.
Figure 3:
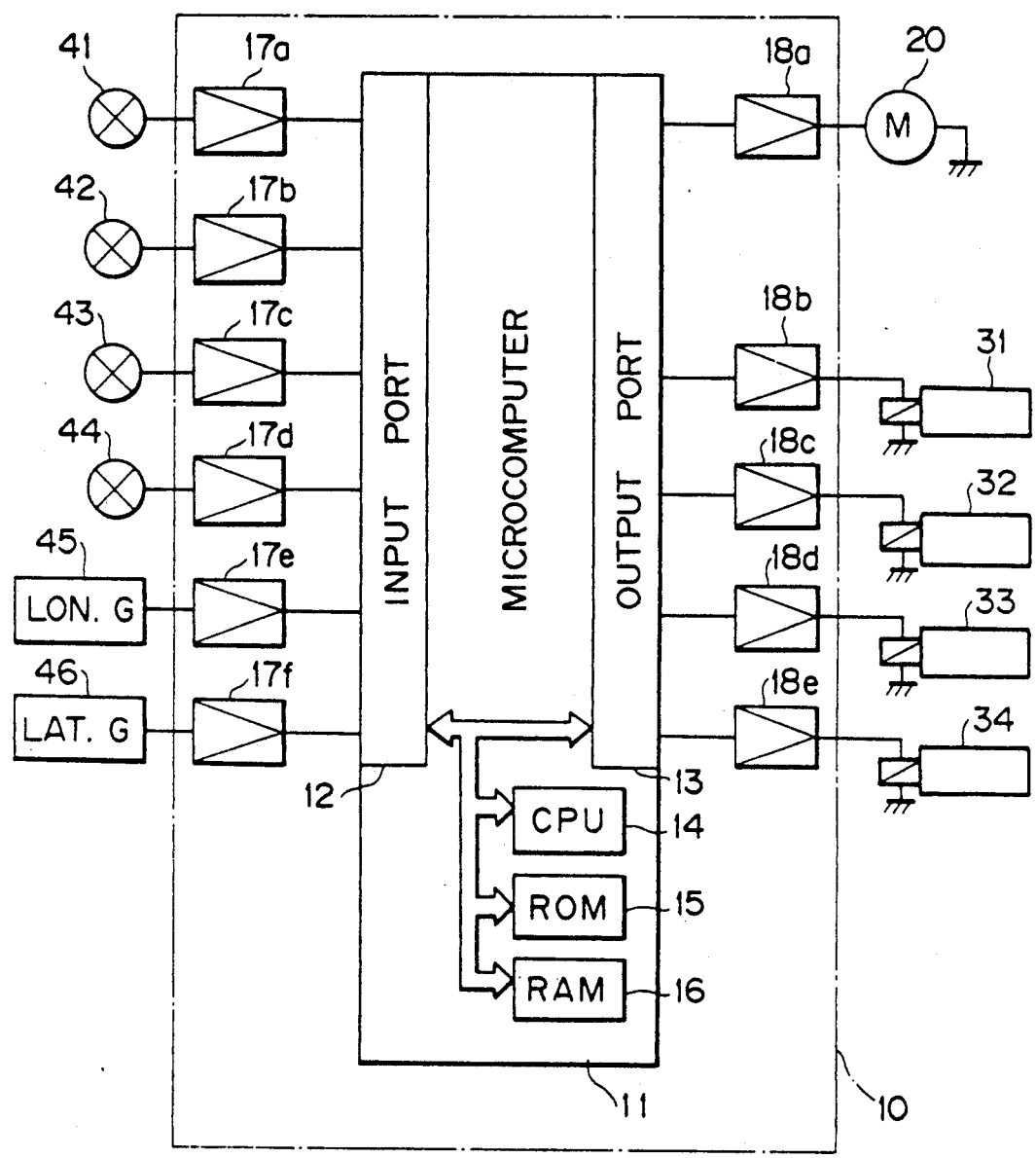
FIG. 3 is a block diagram illustrating the arrangement of the electronic controller shown in FIG. 2.
Figure 4:
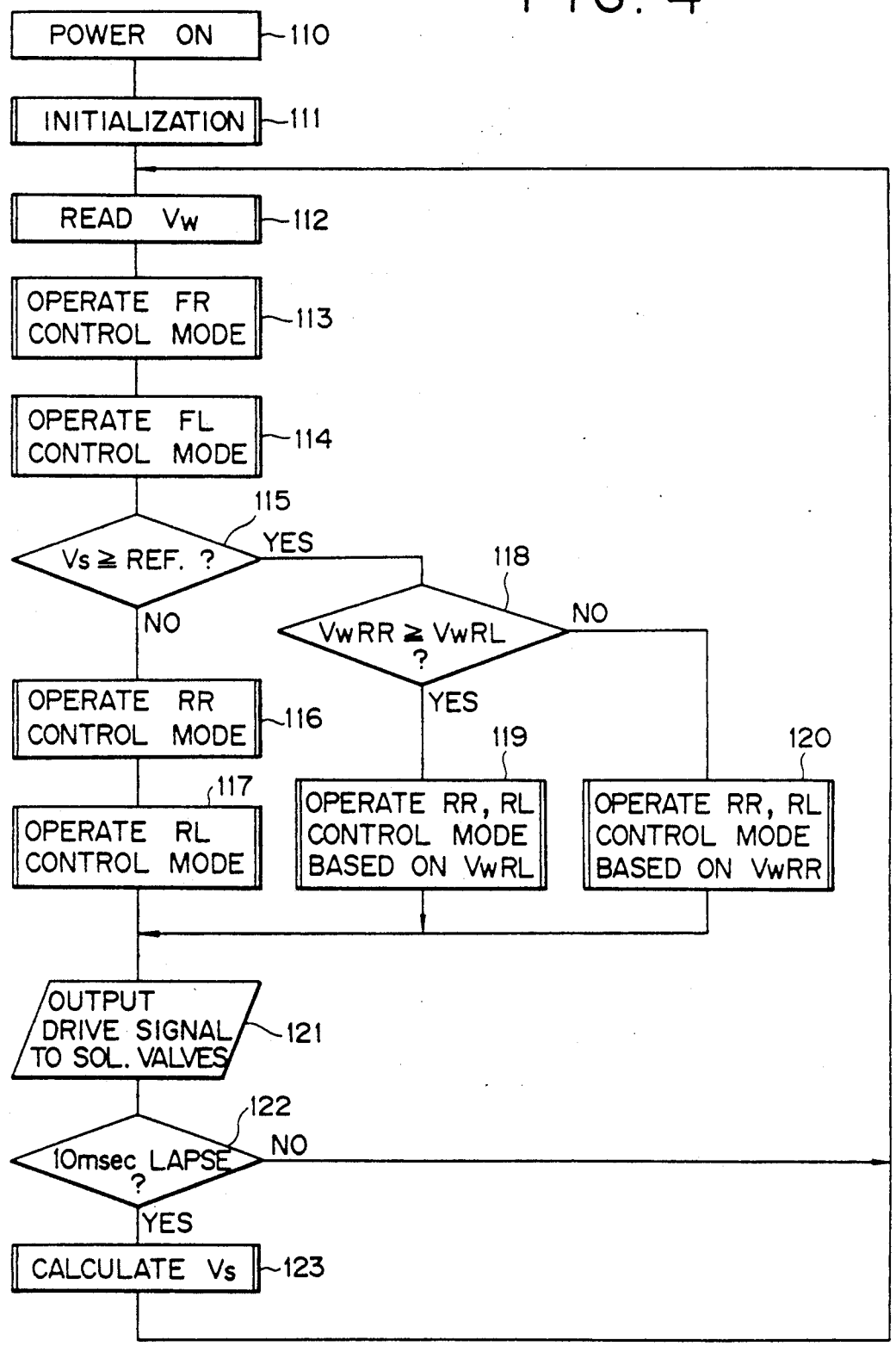
FIG. 4 is a flowchart showing the operation of the anti-skid control of the electronic controller according to an embodiment of the present invention.

More specifically, an embodiment of the present invention is illustrated in FIGS. 2 to 4. Referring to FIG. 2, pumps 21, 22, reservoir 23, 24 and solenoid valves 31 to 34 are disposed in hydraulic circuits for connecting a hydraulic pressure generator 2, which comprises a master cylinder 2a and a booster 2b operated in response to depression of a brake pedal 3, to wheel brake cylinders 51 to 54 of road wheels FR, FL, RR, and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 2.

The solenoid valves 31, 34 are disposed respectively in hydraulic circuits for connecting one output port of the master cylinder 2a to the wheel brake cylinders 51, 54, and the pump 21 is disposed between the solenoid valves 31 and 34. Similarly, the solenoid valves 32, 33 are disposed respectively in hydraulic circuits for connecting the other output port of the master cylinder 2a to the wheel brake cylinders 52, 53, and the pump 22 is disposed between the solenoid valves 32 and 33. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the solenoid valves 31 to 34.

The hydraulic circuits at the drain side of the solenoid valves 31, 34 are connected to the pump 21 through the reservoir 23, and the hydraulic circuits at the drain side of the solenoid valves 32, 33 are connected to the pump 22 through the reservoir 24. Each of the reservoirs 23, 24 is provided with a piston and a spring, and functions so as to store the brake fluid returned from each of the solenoid valves 31 to 34 through the hydraulic circuits at the drain side thereof, and to supply the brake fluid to each of the solenoid valves 31 to 34 when the pumps 21, 22 operate.

Each of the solenoid valves 31 to 34 is a three ports-two positions solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pumps 21, 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 34 energized or de-energized, the hydraulic braking pressure in each of the wheel brake cylinders 51 to 54 is decreased or increased. Namely, when the current is not fed to the solenoid coil, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. As the solenoid valves 31 to 34, there may be employed a three portsthree positions solenoid operated valve which provides one of three operating positions for decreasing, increasing or holding the hydraulic pressure selectively, or a proportional pressure control solenoid valve which controls the hydraulic pressure in linear proportion to the current fed to the solenoid coil.

The above-described solenoid valves 31 to 34 are connected to the electronic controller 10 which controls the operation of the solenoid valves 31 to 34. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal representing a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor As shown in FIG. 3, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signal detected by each of the wheel speed sensors 41 to 44 is fed to the input port 12 via respective amplification circuits 17a to 17d and then to the CPU 14. Then, a control signal is output from the output port 13 to the electric motor 20 via a drive circuit 18a, and control signals are output to the solenoid valves 31 to 34 via the respective drive circuits 18b to 18e.

Further, signals detected by a longitudinal acceleration sensor 45 and a lateral acceleration sensor 46 employed in other embodiments, which will be described later, are fed to the input port 12 via respective amplification circuits 17e, 17f and then to the CPU 14 of the microcomputer 11. As the longitudinal acceleration sensor 45, there is employed a well known acceleration switch which renders contacts to close or open when the acceleration in the longitudinal direction of the vehicle, i.e., the longitudinal acceleration comes to a value less than a predetermined value, that is, when the longitudinal deceleration comes to a value more than the predetermined value. Similarly, as the lateral acceleration sensor 46, there is employed an acceleration switch which renders contacts to close or open when the acceleration in the lateral direction including right and left directions of the vehicle, i.e., the lateral acceleration comes to a value more than a predetermined value.

A program routine executed by the electronic controller 10 for the anti-skid control will now be described with reference to FIG. 4, which is a flowchart showing an operation executed in accordance with a program of one embodiment of the present invention, which program is executed repeatedly at intervals of a predetermined period of time. In this embodiment, neither output signal of the longitudinal acceleration sensor 45 nor that of the lateral acceleration sensor 46 is needed.

The program routine starts at Step 110 when a power source is turned on, and provides for initialization of the system at Step 111, wherein an estimated vehicle speed Vs and wheel speed Vw of each road wheel are set to zero. Then, the program proceeds to Step 112 where the wheel speed Vw detected by each of the wheel speed sensors 41 to 44 is read in the microcomputer 11. The estimated vehicle speed Vs is calculated as follows. A vehicle speed in braking operation is set to a value calculated on the assumption that the vehicle speed is reduced with a predetermined deceleration from the vehicle speed corresponding to the wheel speed in braking operation, and then, if the wheel speed of any one of four road wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed. This calculation of the estimated vehicle speed Vs is executed at Step 123 which will be described later.

Next, the control mode for the anti-skid control is successively operated for each of the front road wheels FR, FL at Steps 113, 114. In the anti-skid control for each road wheel, each of the solenoid valves 31, 32 is controlled, according to a wheel acceleration of each road wheel FR, FL and a slip rate S obtained from the estimated vehicle speed Vs and the wheel speed Vw, such that the slip rate S is optimum in view of the coefficient of friction of the road surface and a lateral force applied to the vehicle. The respective anti-skid control as described above is known, so that the detailed description thereof will be omitted.

When the operation of the control mode for each of the front road wheels FR, FL is executed, the program proceeds to Step 115 where the estimated vehicle speed Vs is compared with a reference value. This reference value is provided according to a selecting condition of the control mode for each of the rear road wheels RR, RL, which will be described later. If the estimated vehicle speed Vs is determined to be equal to or less than the reference value, the program proceeds to Steps 116, 117, where the control mode for each of the rear road wheels RR, RL is operated independently. Namely, the control mode for the rear road wheels is set to an independent control mode for controlling independently a braking force applied to each of the road wheels RR, RL.

On the other hand, when the estimated vehicle speed Vs is determined to exceed the reference value at Step 115, the program proceeds to Step 118 where a value of the wheel speed VwRR of the rear right road wheel RR is compared with a value of the wheel speed VwRL of the rear left road wheel RL. If the former value is equal to or more than the latter value, the program proceeds to Step 119 where the control mode for both the rear road wheels RR, RL is operated on the basis of the latter value, i.e., the value of the wheel speed VwRL at the lower speed side. If the wheel speed VwRR of the rear right road wheel RR is less than the wheel speed VwRL of the rear left road wheel RL, the program proceeds to Step 120 where the control mode for both the road wheels RR, RL is operated on the basis of the former value, i.e., the value of the wheel speed VwRR at the lower speed side. Namely, when the estimated vehicle speed Vs is less than the reference value, the control mode for the rear road wheels is set to a simultaneous control mode for controlling simultaneously a braking force applied to both rear road wheels RR, RL with a braking force applied to the road wheel at the lower speed side.

The program then proceeds to Step 121 where a drive signal is output to each of the solenoid valves 31 to 34 according to each control mode for the road wheels FR, FL, RR, RL, thereby each of the solenoid coils is energized or de-energized. Namely, as for the front road wheels FR, FL, the hydraulic braking pressure supplied to each of the wheel brake cylinders 51 to 54 is controlled in accordance with the independent control mode for each wheel, while as for the rear road wheels RR, RL, the hydraulic braking pressure is controlled in accordance with the independent control mode for each wheel or the simultaneous control mode for both wheels. Then, the program proceeds to Step 122 where it determines if a predetermined period of time, e.g., 10 millisecond (msec) elapses. If the result is affirmative, the program proceeds to Step 123 where the estimated vehicle speed Vs is calculated. If the result is negative at Step 122, the program returns to Step 112 without calculating the estimated vehicle speed Vs to repeat the previous Steps. This predetermined time interval is provided according to the resolving power of the vehicle speed in the microcomputer 11.

As described above, according to the present embodiment, when the estimated vehicle speed Vs exceeds the reference vehicle speed, both the rear road wheels RR, RL are controlled simultaneously in accordance with the simultaneous control mode for both wheels on the basis of the low-select. On the other hand, when the estimated vehicle speed Vs is less than the reference value, each of the rear road wheels RR, RL is controlled independently in accordance with the independent control mode for each wheel. Therefore, the vehicle running stability is ensured in running at high speed. Whereas, the stopping distance is minimized in running at low speed, and particularly, vibrations of the vehicle body generated in running on the road of the low coefficient of friction may be restrained.

In the present embodiment, the estimated vehicle speed Vs corresponds to the vehicle speed in braking operation according to the present invention, and the vehicle speed detecting means of the present invention is constituted from the wheel speed sensors 41 to 44. The wheel speed Vw may be used as it is to represent the vehicle speed, instead of the estimated vehicle speed Vs. As the vehicle speed detecting means, there may be employed means for detecting the vehicle speed through a wind force or the like. Further, in the present embodiment, the low-select is executed, wherein the braking force applied to both the rear road wheels are controlled simultaneously on the basis of the wheel speed of the road wheel at the lower speed side out of the rear road wheels RR, RL. However, both the rear road wheels RR, RL may be controlled simultaneously on the basis of the average of the wheel speed of the right road wheel RR and that of the left road wheel RL, whereby substantially same effect as that of the present embodiment may be obtained.

Figure 5:
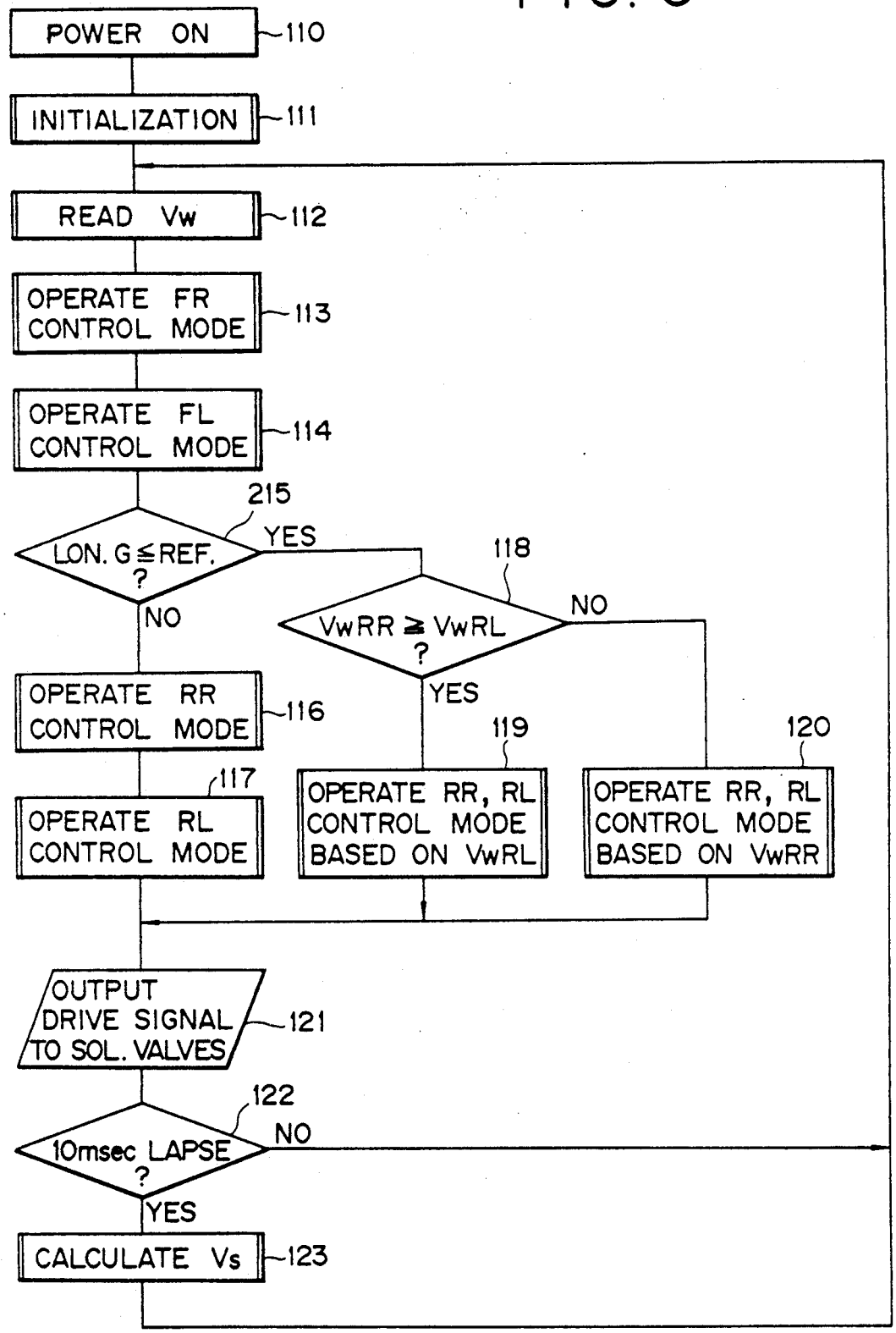
FIG. 5 is a flowchart showing the operation of the anti-skid control of the electronic controller according to another embodiment of the present invention.

FIG. 5 is a flowchart showing a program routine executed by the electronic controller 10 in accordance with another embodiment of the present invention, which is identical with the flowchart shown in FIG. 4 except Step 215. In this embodiment, the signal detected by the longitudinal acceleration sensor 45 shown in FIG. 3 is fed through the input port 12 to the CPU 14 in the electronic controller 10. Namely, referring to FIG. 5, if the longitudinal acceleration of the vehicle (referred to as LON. G in FIGS. 3 and 5) is determined to be equal to or less than a predetermined reference value, or the vehicle deceleration is determined to be more than the reference value at Step 215, the control mode for each of the rear road wheels RR, RL is set to the independent control mode for each wheel (Steps 116, 117). On the other hand, if the longitudinal acceleration exceeds the predetermined reference value, the control mode for each of the rear road wheels is set to the simultaneous control mode for both wheels on the basis of the wheel speed of the road wheel at the lower speed side (Steps 118 to 120).

It is known that the maximum coefficient of friction is obtained immediately before the vehicle stops, so that the longitudinal acceleration is minimized at this time, that is, the deceleration is maximized. Therefore, the longitudinal acceleration in braking operation represents the coefficient of friction of the road surface. Namely, in the case where the longitudinal acceleration is small, that is, the deceleration is large, it may be determined that the coefficient of friction is high, whereas in the case where the longitudinal acceleration is large, that is, the deceleration is small, it may be determined that the coefficient of friction is low. Accordingly, in the case where the longitudinal acceleration is determined to be less than the reference value at Step 215, it is assumed that the braking operation is being made to the vehicle running on the road of the high coefficient of friction, so that the stopping distance of the vehicle is minimized with the independent control mode for each wheel operated. In the case where the longitudinal acceleration exceeds the reference value, it is assumed that the braking operation is being made to the vehicle running on the road of the low coefficient of friction, so that the running stability is ensured with the simultaneous control mode for both wheels operated. As means for determining the coefficient of friction, means for estimating the coefficient of friction on the road surface according to the rate of change in the wheel speed during the control of the braking force applied to the road wheel, or according to a pattern of hydraulic pressure control signals for braking, are known and may be used instead of the longitudinal acceleration sensor 45 in the present embodiment.

Figure 6:
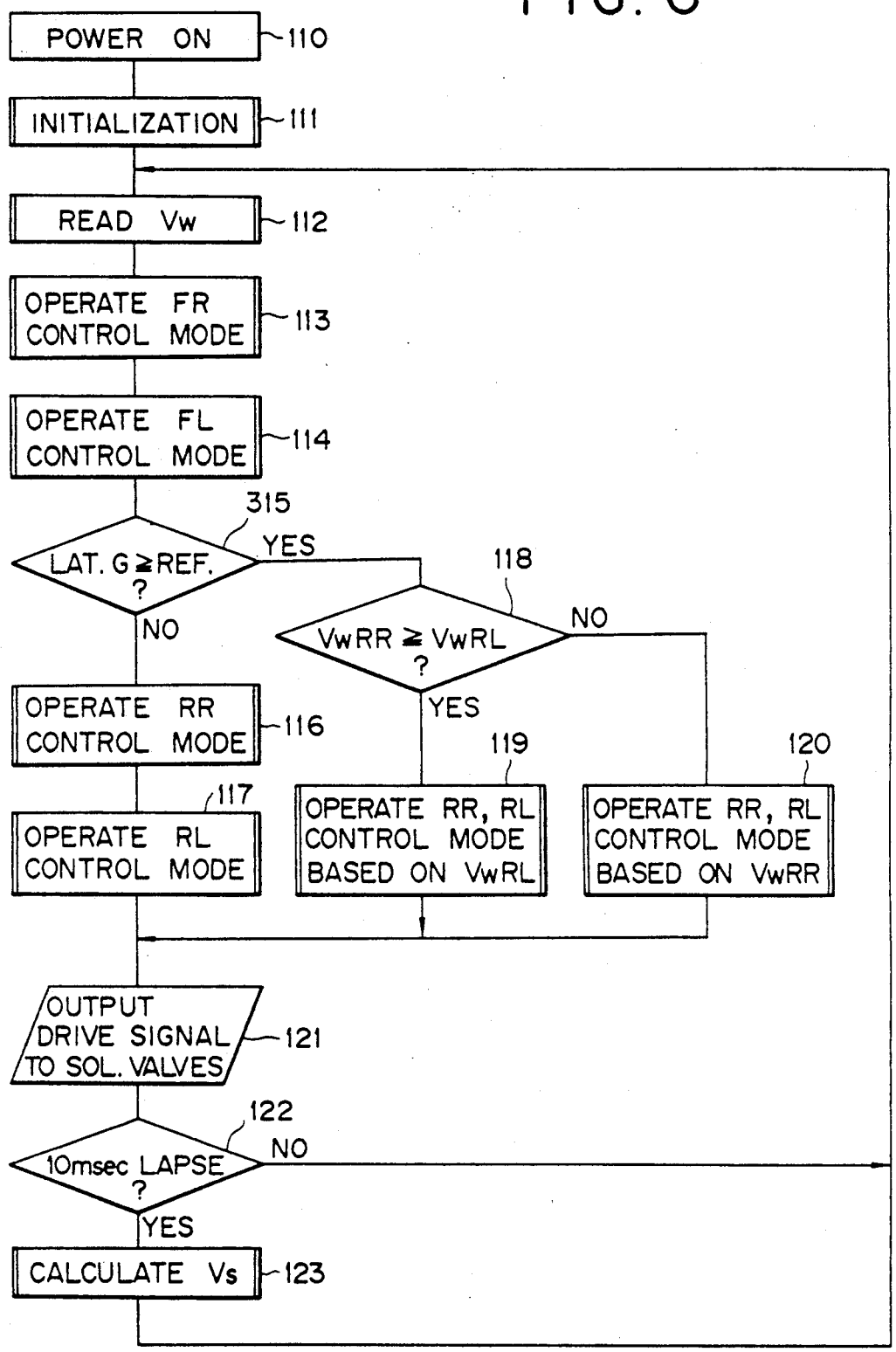
FIG. 6 is a flowchart showing the operation of the anti-skid control of the electronic controller according to a further embodiment of the present invention.

FIG. 6 is a flowchart showing a program routine executed in accordance with a further embodiment of the present invention, which is identical with the flowchart shown in FIG. 4 except Step 315. In this embodiment, the signal detected by the lateral acceleration sensor 46 shown in FIG. 3 is fed through the input port 12 to the CPU 14. Referring to FIG. 6, if the lateral acceleration of the vehicle (referred to as LAT. G in FIGS. 3 and 6) is determined to be equal to or more than the predetermined reference value at Step 315, the control mode for each of the rear road wheels RR, RL is set to the independent control mode for each wheel (Steps 116, 117). On the other hand, if the lateral acceleration is determined to be less than the predetermined reference value, the control mode for each of the rear road wheels is set to the simultaneous control mode for both wheels on the basis of the wheel speed of the road wheel at the lower speed side (Steps 118 to 120).

In the case where the lateral acceleration of the vehicle is large, it is assumed that a difference in dynamic load between the right and left rear road wheels RR, RL is large. For instance, the wheel speed of the road wheel at the inner side of the rear road wheels RR, RL in turning of the vehicle is less than the other, so that the stopping distance is disadvantageously extended if the anti-skid control is operated on the basis of the inner side wheel speed. This disadvantage is remarkable in braking operation on the road of the high coefficient of friction particularly. In this embodiment, therefore, each of the rear road wheels RR, RL is controlled independently in accordance with the independent control mode for each wheel (Steps 116, 117) to thereby minimize the stopping distance. When the lateral acceleration is small, the rear road wheels are controlled simultaneously in accordance with the simultaneous control mode for both wheels, so that a yaw rate is restrained as small as possible. Further, instead of the lateral acceleration sensor 46 used in the present embodiment, means for detecting a steering angle of a steering wheel may be employed.

In the embodiments as described above, various means have been disclosed for the braking condition determining means according to the present invention. Some of these means may be combined together to determine a certain braking condition, so that the control mode may be changed over in response to the determined braking condition. For instance, the anti-skid control may be executed according to the conditions provided for the rear road wheels RR, RL, as follows:

|  | LON.G ≦ REF. | LON.G > REF. | LAT.G ≧ REF. |
| --- | --- | --- | --- |
| Vs ≧ Vr | Ind. Cont. | Sim. Cont. | Ind. Cont. |
| Vs < Vr | Ind. Cont. | Ind. Cont. | Ind. Cont. | where "Vr" corresponds to a reference vehicle speed, "Ind. Cont." corresponds to the independent control mode for each wheel, and "Sim. Cont." corresponds to the simultaneous control mode for both wheels on the basis of the wheel speed of the road wheel at the lower speed side.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of a vehicle, comprising:

braking condition detecting means for detecting at least one running condition of said vehicle in a braking operation and producing a detached signal corresponding to said running condition;

reference value setting means for setting a reference value representing a predetermined running condition of said vehicle corresponding to said one running condition;

braking condition determining means for comparing said detected signal with said reference value and producing a braking condition signal in response to a result of comparison;

control mode changing means for selectively providing one control mode of a simultaneous control mode for controlling simultaneously a braking force applied to both of a pair of right and left rear road wheels and an independent control mode for controlling independently a braking force applied to each of said right and left rear road wheels in response to said braking condition signal; and braking force control means for controlling said braking force applied to said road wheels in accordance with said control mode provided by said control mode changing means.

2. An anti-skid control system for an automotive vehicle as set forth in claim 1, wherein said control mode changing means provides said simultaneous control mode for controlling simultaneously said braking force applied to both of a pair of right and left rear road wheels on the basis of a braking force applied to one of said right and left rear road wheels rotating at the lower speed thereof.

3. An anti-skid control system for an automotive vehicle as set forth in claim 1, wherein said braking condition detecting means comprises vehicle speed detecting means for detecting at least a vehicle speed of said vehicle in braking operation and producing a detected signal corresponding to said vehicle speed, and wherein said reference value setting means sets a predetermined vehicle speed as said reference value and said braking condition determining means compares said detected vehicle speed signal in magnitude with said predetermined vehicle speed.

4. An anti-skid control system for an automotive vehicle as set forth in claim 1, wherein said braking condition detecting means comprises means for detecting a signal corresponding to a coefficient of friction of a road surface in braking operation and producing a detected signal corresponding to said coefficient of friction.

5. An anti-skid control system for an automotive vehicle as set forth in claim 4, wherein said means for detecting said signal corresponding to said coefficient of friction comprises longitudinal acceleration detecting means for detecting a longitudinal acceleration of said vehicle in braking operation and producing a detected signal corresponding to said longitudinal acceleration, and wherein said reference value setting means sets a predetermined longitudinal acceleration as said reference value and said braking condition determining means compares said detected longitudinal acceleration signal in magnitude with said predetermined longitudinal acceleration.

6. An anti-skid control system for an automotive vehicle as set forth in claim 1, wherein said braking condition detecting means comprises lateral acceleration detecting means for detecting a lateral acceleration of said vehicle in braking operation, and wherein said reference value setting means sets a predetermined lateral acceleration as said reference value and said braking condition determining means compares said lateral acceleration signal in magnitude with said predetermined lateral acceleration.

7. An anti-skid control system for controlling a braking force applied to each of front and rear road wheels of a vehicle, comprising:

vehicle speed detecting means for detecting at least a vehicle speed of said vehicle in braking operation and producing a detected signal corresponding to said vehicle speed;

reference value setting means for setting a reference value representing a predetermined vehicle speed;

braking condition determining means for comparing said detected vehicle speed signal in magnitude with said reference value and producing a braking condition signal in response to a result of comparison;

control mode changing means for selectively providing one control mode of a simultaneous control mode for controlling simultaneously a braking force applied to both of a pair of right and left rear road wheels on the basis of a braking force applied to one of said right and left rear road wheels rotating at the lower speed thereof and an independent control mode for controlling independently a braking force applied to each of said right and left rear road wheels in response to said braking condition signal; and braking force control means for controlling said braking force applied to each of said front and rear road wheels of said vehicle, said braking force control means controlling said braking force applied to said right and left rear road wheels in accordance with said control mode provided by said control mode changing means.

* * * * *